US011650957B2

(12) United States Patent
Puvvada et al.

(10) Patent No.: US 11,650,957 B2
(45) Date of Patent: May 16, 2023

(54) RECEIVING AT A CACHE NODE NOTIFICATION OF CHANGES TO FILES IN A SOURCE FILE SYSTEM SERVED FROM A CACHE FILE SYSTEM AT THE CACHE NODE

(71) Applicant: International Business Machines Corporation, Armonk, NY (US)

(72) Inventors: Venkateswara Rao Puvvada, Inkollu (IN); Karrthik K G, Kodaikanal (IN); Saket Kumar, Bettiah (OM); Ravi Kumar Komanduri, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/336,069

(22) Filed: Jun. 1, 2021

(65) Prior Publication Data

US 2022/0382714 A1     Dec. 1, 2022

(51) Int. Cl.
*G06F 7/00* (2006.01)
*G06F 16/172* (2019.01)

(52) U.S. Cl.
CPC .................. *G06F 16/172* (2019.01)

(58) Field of Classification Search
CPC .................................................. G06F 16/172
See application file for complete search history.

(56) References Cited

U.S. PATENT DOCUMENTS

| | | | | |
|---|---|---|---|---|
| 5,113,514 | A | * | 5/1992 | Albonesi ............. G06F 12/0811 711/E12.024 |
| 5,651,125 | A | * | 7/1997 | Witt .................... G06F 9/30112 712/E9.055 |
| 5,813,016 | A | * | 9/1998 | Sumimoto .......... G06F 16/1767 |
| 5,944,789 | A | * | 8/1999 | Tzelnic ............... G06F 12/0813 709/214 |
| 5,978,805 | A | * | 11/1999 | Carson ................ G06F 16/1787 |
| 6,029,175 | A | * | 2/2000 | Chow .................... H04L 67/02 |

(Continued)

OTHER PUBLICATIONS

Anonymous, "System and Method to Optimize Data Synchronization Between Panache Cache and Home by Using Prioritization Based on Mechanism", IP.Com No. IPCOM000240560D, Published Feb. 9, 2015, 4 pp.

(Continued)

*Primary Examiner* — Mohammed R Uddin
(74) *Attorney, Agent, or Firm* — Konrad Raynes Davda & Victor LLP; David W. Victor

(57) ABSTRACT

Provided are a computer program product, system, and method receiving at a cache node notification of changes to files in a source file system served from a cache file system at the cache node. A cache file system is established at the cache node as a local share of a source file system at the source node. The source node establishes a local share of the cache file system at the cache node. Notification is received, from the source node, that the source node modified a source control file for a source file at the source node. In response to receiving the notification, a cache control file, for a cached file in the cache file system, is updated to indicate the source file at the source node is modified. A request is sent to the source node to obtain data for the source file indicated as modified.

20 Claims, 6 Drawing Sheets

(56) References Cited

U.S. PATENT DOCUMENTS

| | | | |
|---|---|---|---|
| 6,438,743 B1* | 8/2002 | Boehm | G06F 8/71 |
| | | | 717/124 |
| 7,831,634 B2* | 11/2010 | Petev | G06F 12/0842 |
| | | | 707/813 |
| 7,890,551 B2* | 2/2011 | Benelisha | G06F 16/1815 |
| | | | 707/821 |
| 9,176,980 B2 | 11/2015 | Ananthanarayanan et al. | |
| 9,355,120 B1* | 5/2016 | Slik | G06F 16/185 |
| 9,881,018 B2 | 1/2018 | Islam | |
| 11,436,195 B2 | 9/2022 | Maybee | |
| 2002/0059499 A1* | 5/2002 | Hudson | G06F 16/40 |
| | | | 709/217 |
| 2002/0083120 A1 | 6/2002 | Soltis | |
| 2004/0054777 A1* | 3/2004 | Ackaouy | G06F 16/9574 |
| | | | 709/216 |
| 2006/0161518 A1* | 7/2006 | Lacapra | H04L 61/4552 |
| 2008/0010381 A1 | 1/2008 | Barraclough | |
| 2008/0306954 A1* | 12/2008 | Hornqvist | G06F 16/168 |
| | | | 707/999.009 |
| 2009/0198790 A1* | 8/2009 | Grevers, Jr. | H04L 67/288 |
| | | | 709/213 |
| 2011/0145363 A1* | 6/2011 | Ananthanarayanan | |
| | | | G06F 16/172 |
| | | | 709/218 |
| 2011/0197032 A1* | 8/2011 | Patey | G06F 16/24552 |
| | | | 709/224 |
| 2012/0054152 A1* | 3/2012 | Adkins | G06F 16/2365 |
| | | | 707/623 |
| 2012/0096059 A1* | 4/2012 | Shimizu | G06F 3/0689 |
| | | | 707/828 |
| 2014/0025837 A1* | 1/2014 | Swenson | H04N 21/2396 |
| | | | 709/231 |
| 2014/0317359 A1* | 10/2014 | Naik | G06F 16/16 |
| | | | 711/141 |
| 2015/0379035 A1 | 12/2015 | Noronha et al. | |
| 2016/0026579 A1 | 1/2016 | Samanta | |
| 2016/0048532 A1* | 2/2016 | Islam | G06F 16/172 |
| | | | 707/613 |
| 2016/0321291 A1 | 11/2016 | Malhotra | |
| 2017/0075917 A1* | 3/2017 | Heemskerk | G06F 8/71 |
| 2017/0344481 A1* | 11/2017 | Pack, III | G06F 12/0833 |
| 2018/0150477 A1* | 5/2018 | Jewell | G06F 16/1734 |
| 2019/0347337 A1* | 11/2019 | Roy | G06F 16/13 |
| 2021/0200641 A1 | 7/2021 | Bafna | |
| 2022/0268665 A1* | 8/2022 | Leclerc | G01M 11/33 |
| 2022/0382715 A1 | 12/2022 | Puvvada | |

OTHER PUBLICATIONS

List of IBM Patents or Patent Applications Treated as Related, Jun. 1, 2021, 2 pp. [18.946 (Appendix P)].

U.S. Appl. No. 17/336,079, filed Jun. 1, 2021, pp. 29 [18.941 (Appln)].

Office Action dated Oct. 14, 2022, 23 pp. for U.S. Appl. No. 17/336,079, (18.941).

Response dated Jan. 7, 2023, 13 pp. to Office Action dated Oct. 14, 2022, 23 pp. for U.S. Appl. No. 17/336,079, (18.941).

Notice of Allowance dated Feb. 14, 2023, 10 pp., for U.S. Appl. No. 17/336,079, (18.941).

* cited by examiner

RECEIVING AT A CACHE NODE NOTIFICATION OF CHANGES TO FILES IN A SOURCE FILE SYSTEM SERVED FROM A CACHE FILE SYSTEM AT THE CACHE NODE

BACKGROUND OF THE INVENTION

1. Field of the Invention

The present invention relates to a computer program product, system, and method receiving at a cache node notification of changes to files in a source file system served from a cache file system at the cache node.

2. Description of the Related Art

In clustered file system environment, data may be moved from a home cluster (also referred to herein as a source cluster) to another cluster referred to as the cache cluster to cache data from the home cluster for use by applications proximate to the cache cluster. Since the home cluster is continuously modified, the cache cluster needs to continuously send requests to lookup metadata or inodes from the home cluster to synchronize the cache cluster with the home cluster so that the cache cluster does not serve stale data to users.

To accomplish this synchronization, the cache cluster may frequently send Remote Procedure Calls (RPCs) to the home cluster to retrieve updated contents for data and metadata maintained at the cache cluster. The cache cluster will perform lookup/getAttr/readdir operations to retrieve data from the home cluster to keep the cache cluster current. The lookup operation is used to fetch file system attributes and metadata for a file/dir/object, including modification time, creation time, access time, etc.

The cache cluster may use a refresh interval to periodically lookup the metadata or inode information for each file with the home cluster. If an application requests the metadata or inode for a file from the cache cluster, and if the refresh interval has expired, then a lookup of the requested metadata, or inode, is performed. If the refresh interval has not expired, then the metadata is served from the cache file system without updating from the home cluster.

There is a need in the art for improved techniques to synchronize a cache cluster with changes made to files and file metadata in a home cluster used.

SUMMARY

Provided are a computer program product, system, and method receiving at a cache node notification of changes to files in a source file system served from a cache file system at the cache node. A cache file system is established at the cache node as a local share of a source file system at the source node. The source node establishes a local share of the cache file system at the cache node. Notification is received, from the source node, that the source node modified a source control file for a source file at the source node. In response to receiving the notification, a cache control file, for a cached file in the cache file system comprising a copy of the source file, is updated to indicate the source file at the source node is modified. A request is sent to the source node to obtain data for the source file indicated as modified in the cache control file in response to an application request for the source file.

DETAILED DESCRIPTION

In current distributed cache systems, the cache cluster will periodically perform lookups to the home cluster to retrieve metadata for cached files. If a refresh interval has expired when an application node attempts to access file metadata from the cache cluster, then the cache cluster will retrieve the requested metadata from the home cluster even if the data remains unchanged and the lookup is not necessary. This results in unnecessary latency to lookup metadata from the home cluster, even when the metadata has not changed at the home cluster.

Described embodiments provide improvements to computer technology for synchronizing a cache node with changes in a source node. In described embodiments, a cache node does not perform a lookup of metadata at a source node, such as a home cluster, unless the source node has notified the cache node of a change to data or metadata for a file cached in the cache node. In this way, the cache node only requests metadata or data for a file from the source node upon receiving a request for metadata or data for a file from an application submitting the request to the cache node. With certain embodiments, a cache control file updated from the source node may indicate the metadata and/or data for the requested file has changed. This reduces latency in making unnecessary requests form metadata and/or data for a file from the source node.

Figure 1:
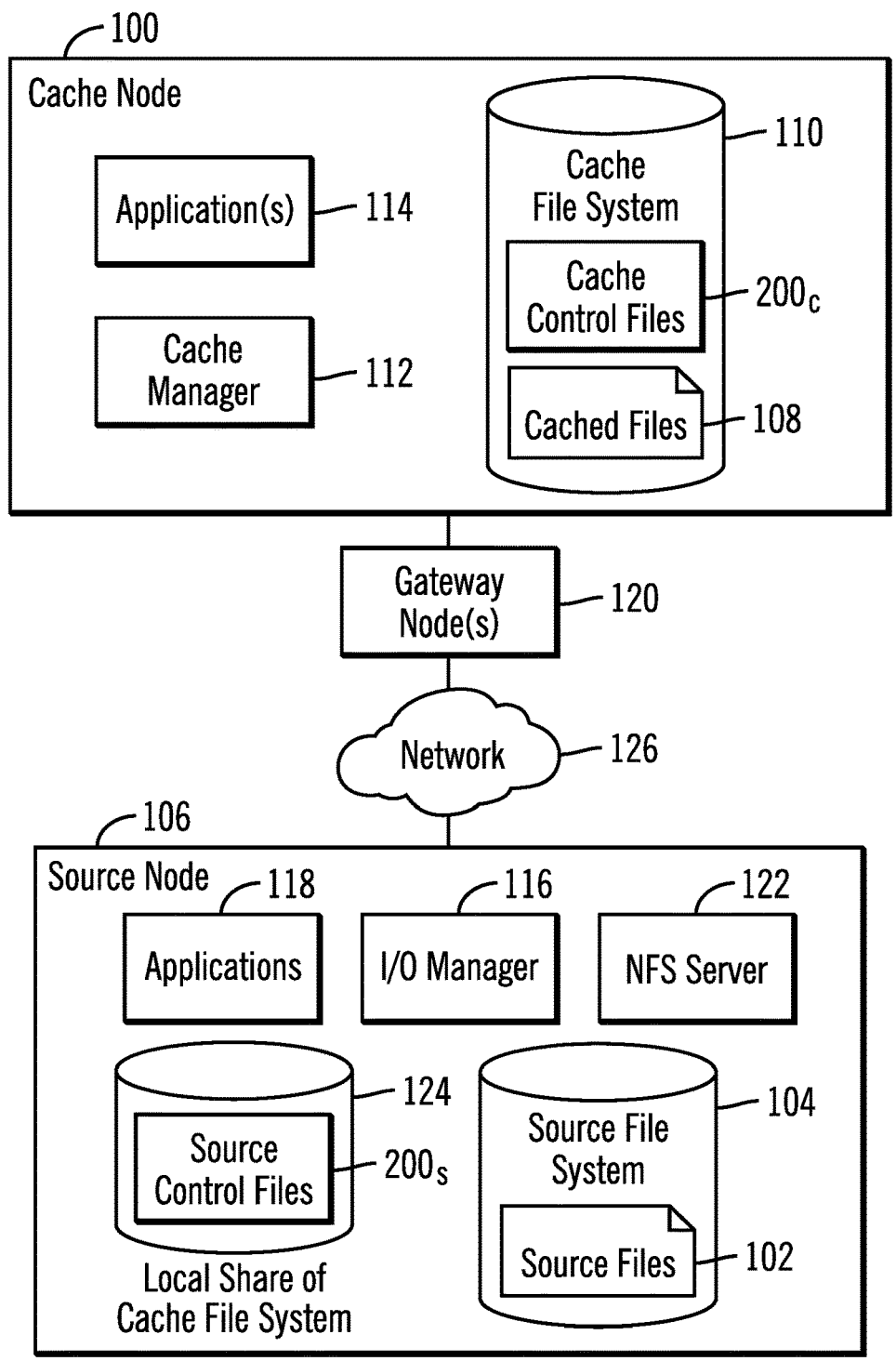
FIG. 1 illustrates an embodiment of a distributed caching environment.

FIG. 1 illustrates an embodiment of a distributed cache computing environment having a cache node 100 to cache some or all of the source files 102 in a source file system 104 at a source node 106 as cached files 108 in a cache file system 110 at the cache node 100. A file may comprise a file, object, file set, data set, or A cache manager 112 at the cache node 100 manages application 114 requests to source files 102 that may be cached as cached files 108 in the cache file system 110. The source node 106 includes an Input/Output (I/O) manager 116 to manage requests to the source files 102 from applications 118 at the source node 106. The cache 100 and source nodes 106 may comprise clusters of nodes.

A gateway node 120 manages requests from the cache manager 112 for source files 102 to cache in the cache file system 110. The source file system 110 is exported to the cache node 100 through a Network File Storage (NFS) server 122 at the source node 106 to export the source file system 104 to other servers. The cache manager 112 creates the cache file system 110 to serve all or part of the source files 102 in the cache file system 110. On a first access request at the cache file system 110, the gateway node 120 mounts a home export of the source file system 104 through the NFS server 122 to the cache file system 110. The gateway node 120 further exports the cache file system 110 to the source node 120 to mount as a local share of the cache file system 124 comprising a reverse mount of the cache file system 110 mounted from an export of the source file system 104. Communications between the source file system 104 and the cache file system 110 go through the gateway node 120 over network 126. The applications 114 and 118 may comprise separate application nodes 114, 118.

The cache file system 110 maintains cache control files 200c indicating whether metadata and/or data for the source files 102 was changed at the source node 102, which correspond to the source control files 200s maintained at the source node 106 in the local share of the cache file system 124.

The gateway nodes 120 may function as servers, exporting the source control files 200s. The source node 106 may further function as a client to this gateway node 120 server.

Generally, program modules, such as the program components 112, 114, 116, 118, 120, 122 may comprise routines, programs, objects, components, logic, data structures, and so on that perform particular tasks or implement particular abstract data types. The program components of FIG. 1 may be implemented in one or more computer systems, where if they are implemented in multiple computer systems, then the computer systems may communicate over a network The programs 112, 114, 116, 118, 120, 122 may comprise program code loaded into memory and executed by a processor. Alternatively, some or all of the functions may be implemented in hardware devices, such as in Application Specific Integrated Circuits (ASICs) or executed by separate dedicated processors.

The network 126 may comprise a Storage Area Network (SAN), Local Area Network (LAN), Intranet, the Internet, Wide Area Network (WAN), peer-to-peer network, wireless network, arbitrated loop network, etc. The network 126 may be implemented as a single network or more than two networks.

The cache node 100 and cache file system 110 may be implemented in a cloud computing environment.

Figure 2:
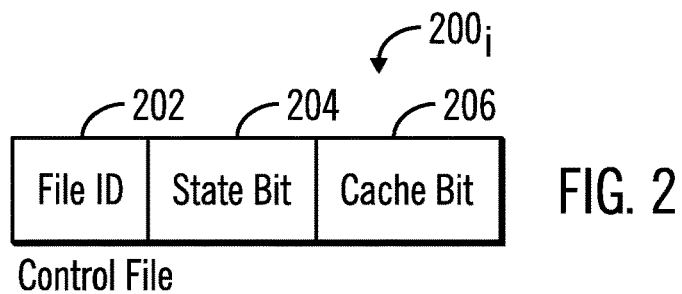
FIG. 2 illustrates an embodiment of a control file indicating whether the source node has modifications for files and metadata.

FIG. 2 illustrates an embodiment of a control file 200, such as cache 200c and source 200s control files, and may include a file identifier (ID) 202 of the source file 102 being served to the cache file system 110; a state bit 204 indicating whether metadata for the source file 202 has been modified in the source file system 104; and a cache bit 206 indicating whether data in the source file 202 has been modified in the source file system 104.

Figure 3:
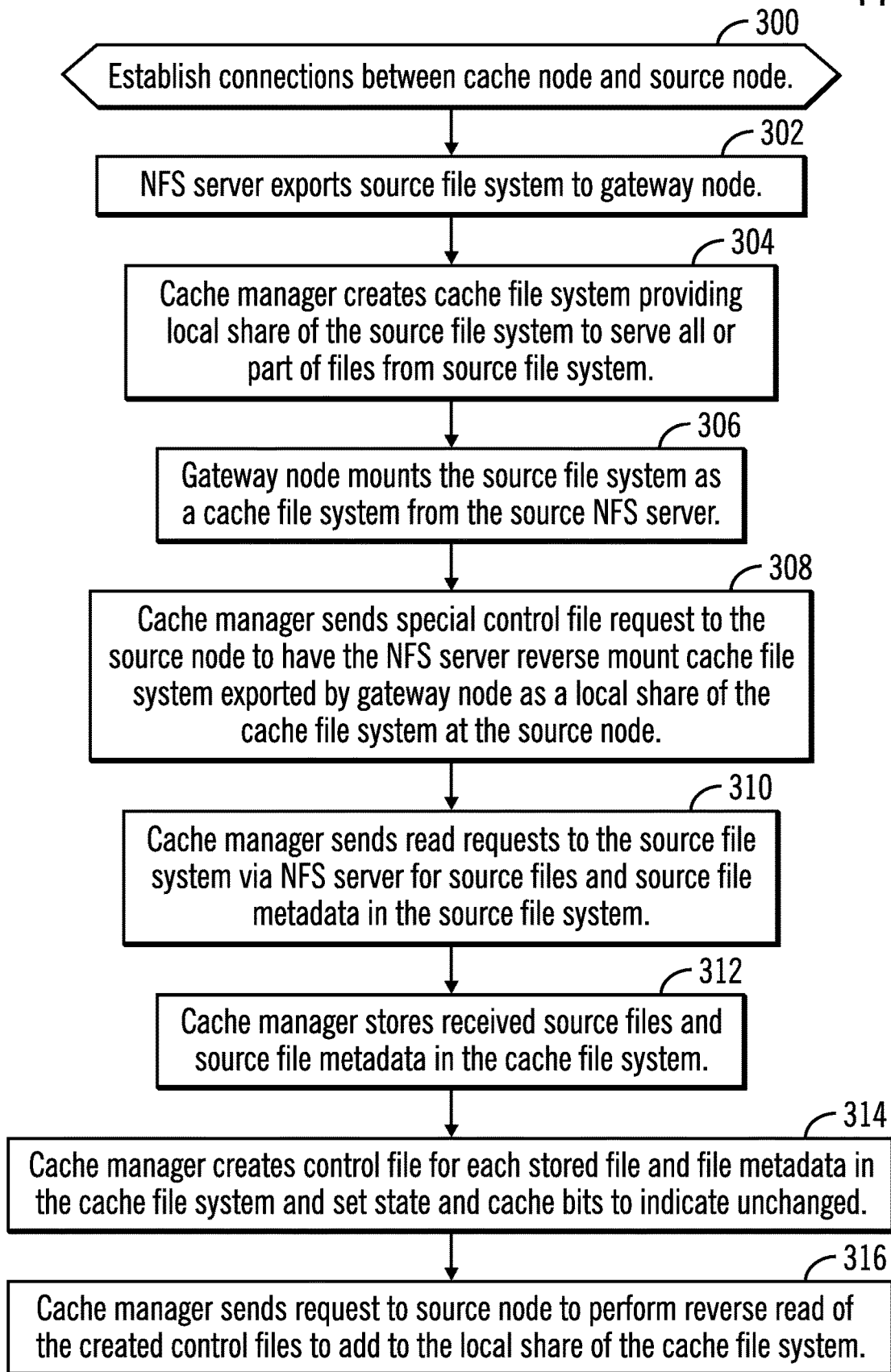
FIG. 3 illustrates an embodiment of operations to establish connections between a source node and a cache node providing distributed caching of files for the source node.

FIG. 3 illustrates an embodiment of operations performed to establish the connections between the cache node 100 and source node 106 to share the source files 102 from the source file system 104 in the cache file system 110 as cached files 108 in a manner that reduces the need of the cache manager 112 to constantly have to determine whether the source files 102, cached in the cache file system 110 as cached files 108, were changed in the source node 106. Upon initiating the operations to establish (at block 300) the connections, the NFS server 122 exports (at block 302) the source file system 104, such as configuration information for the source file system 104, to the gateway node 120. The cache manager 112 creates (at block 304) the cache file system 110 providing the local share of the source file system 104 to serve all or part of the source files 102 from the source file system 104. In response to a first access request for a file at the cache file system 110, the gateway node 120 mounts (at block 306) the source file system 104 as the cache file system 110 from the NFS server 122. The cache manager 112 sends (at block 308) a special control file request to the source node 106 to have the NFS server 122 reverse mount the cache file system 110 exported by the gateway node 120 as a local share of the cache file system 124 at the source node. 106.

The cache manager 112 sends (at block 310) read requests to the source file system 104 via the NFS server 122 for source files 102 and metadata in the source file system 104. The cache manager 112 stores (at block 312) the received source files 102 and their metadata in the cache file system 110 as cached files 108. The cache manager 112 creates (at block 314) a cache control file 200c for each cached file 108 and file metadata in the cache file system 110 and sets state 204 and cache bits 206 in the cache control file 200c to indicate the corresponding source file 102 and metadata are unchanged at the source file system 104. The cache manager 112 sends (at block 316) a request to the source node 106 to perform a reverse read of the created cache control files 200c to add to the local share of the cache file system 124 as source control files 200s.

With the embodiment of FIG. 3, the source file system 104 is mounted as the cache file system 110 on the cache node 100, and a reverse mount of the cache file system 110 is performed to reverse mount the cache file system 110 as a local share of the cache file system 124. This reverse mount provides a channel to notify the cache file system 110 of changes to metadata for the source files 102. In certain embodiments, the mountpoint for this reverse of the local share of the cache file system 124 is created at the root of the fileset/filesystem or sub-directory that is exported for use by the cache file system 110 from the NFS server 122. When the gateway node 120 mounts the export of the source file system 104 to mount at the cache node 114, the cache manager 112 sends a special mount request through the cache control file 200c so that the corresponding NFS export from the gateway node 120 is mounted as the local share of the cache file system 124 on the source node 106. The mountpoint for the local share of the cache file system 124 at the source node 118 may be created within the export path as a hidden directory, and is identified through its unique cache side reference, either the cache root inode number of the export path or the name of the export path at cache file system 110. This unique identification allows the NFS server 122 to update all appropriate metadata, or inodes, pertaining to the subdirectories to their respective cache file system 110 mount paths present at any of the parent directories until the root of the file system.

Figure 4:
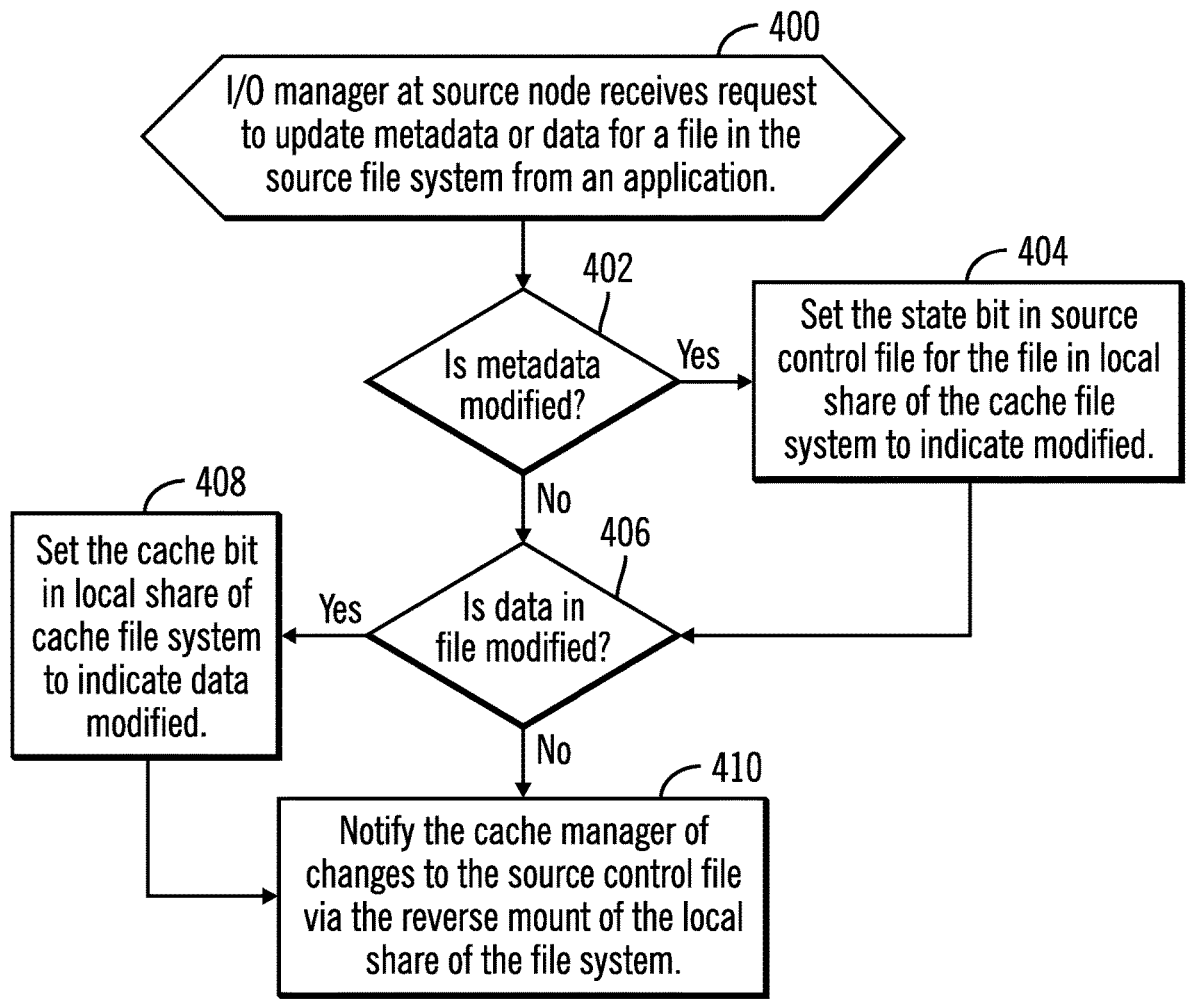
FIG. 4 illustrates an embodiment of operations for the source node to process a request to update metadata or data for a file in the source file system.

FIG. 4 illustrates an embodiment of operations performed by the I/O manager 116 at the source node 106 to process application 118 requests to modify metadata and/or file data for a source file 102. Upon receiving (at block 400) a request to update metadata and/or file data for a source file 102, if (at block 402) the metadata is modified, then the state bit 204 in the source control file 200s in the local share of the cache file system 124 is set (at block 404) to indicate metadata is modified. If (at block 402) metadata is not modified or the state 204 bit is set (at block 404), then if (at block 406) the data for the source file 102 is modified, then the cache bit 206 is set (at block 408) to indicate the data was modified in the source file 102. From block 408 or if (at block 406) the data is not modified, then the I/O manager 116 notifies (at block 410) the cache manager 112 of changes to the source control file 200s via the reverse mount of the local share of the file system 124.

With the embodiment of FIG. 4, when a source file 102 is updated in the source file system 104, then the I/O manager 116 updates the source control file 200s to indicate that metadata and/or file data for the source file 102 was changed, and this change is communicated through the gateway node 120 to the cache manager 112 to cause the cache manager 112 to read the updated source control file 200s and store as a cache control file 200c in the cache file system 110. In this way, the cache node 100 does not have to constantly send lookup requests to the source node 106 to determine if data cached in the remote cache file system 110 was changed at the source node 106 because the reverse mounting of the local share of the cache file system 200s provides for communication of changes to the source control files 200s to the cache manager 112.

In one embodiment, the I/O manager 116 has information on the detail of counterpart metadata, e.g., inodes, served at the cache file system 110, so that when metadata is modified at the source file system 104, a corresponding notification is sent to the cache file system 110. In certain implementations, the source node 106 may store file handles to each of the counterpart cache file system 110 elements, such as file(s)/directory(s)/object(s), corresponding to the source file system 104 home side file(s)/directory(s)/object(s). In an implementation where the cache file system 110 resides in the cloud, such as the case for an edge cache, then the source node 106 may store a shortened version of the local foldValue and the name of the object at local to allow for a path based lookup to the cache file system 110 objects to update them as necessary.

In certain implementations where the cache file system 110 comprises an on-premises file system, extended attributes of each source file system 104 file/directory/object include a remote inode number or fold Value plus a local name combination of the entity, and the cached file handle. This allows an NFS client on the source node 106 to send all updates on metadata, e.g., an inode, upwards through the mount into the corresponding control file.

Figure 5:
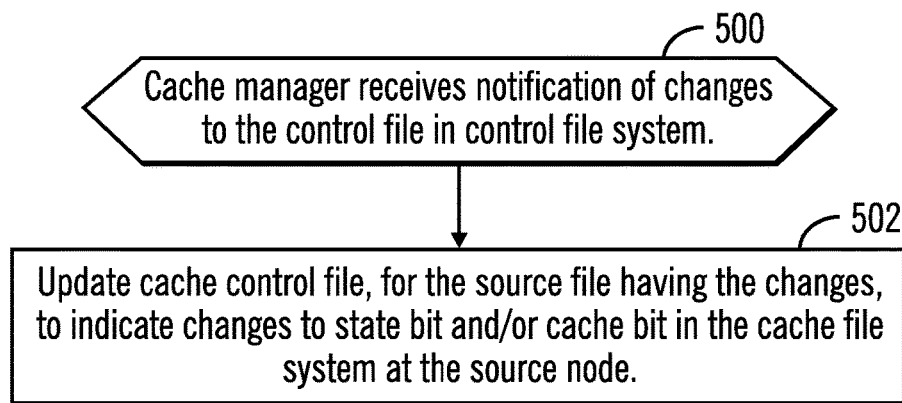
FIG. 5 illustrates an embodiment of operations for the cache node to process a notification from the source node of changes to a source file in the source file system.

FIG. 5 illustrates an embodiment of operations performed by the cache manager 112 upon receiving notification from the source node 106 of changes to a source control file 200s. Upon receiving (at block 500) notification of changes, the cache manager 112 updates (at block 502) the cache control file 200c, for the source file 102 having the changes, to indicate changes to the state bit 204 and/or cache bit 206 for changes to the metadata and/or file data in the source file system 104.

Figure 6:
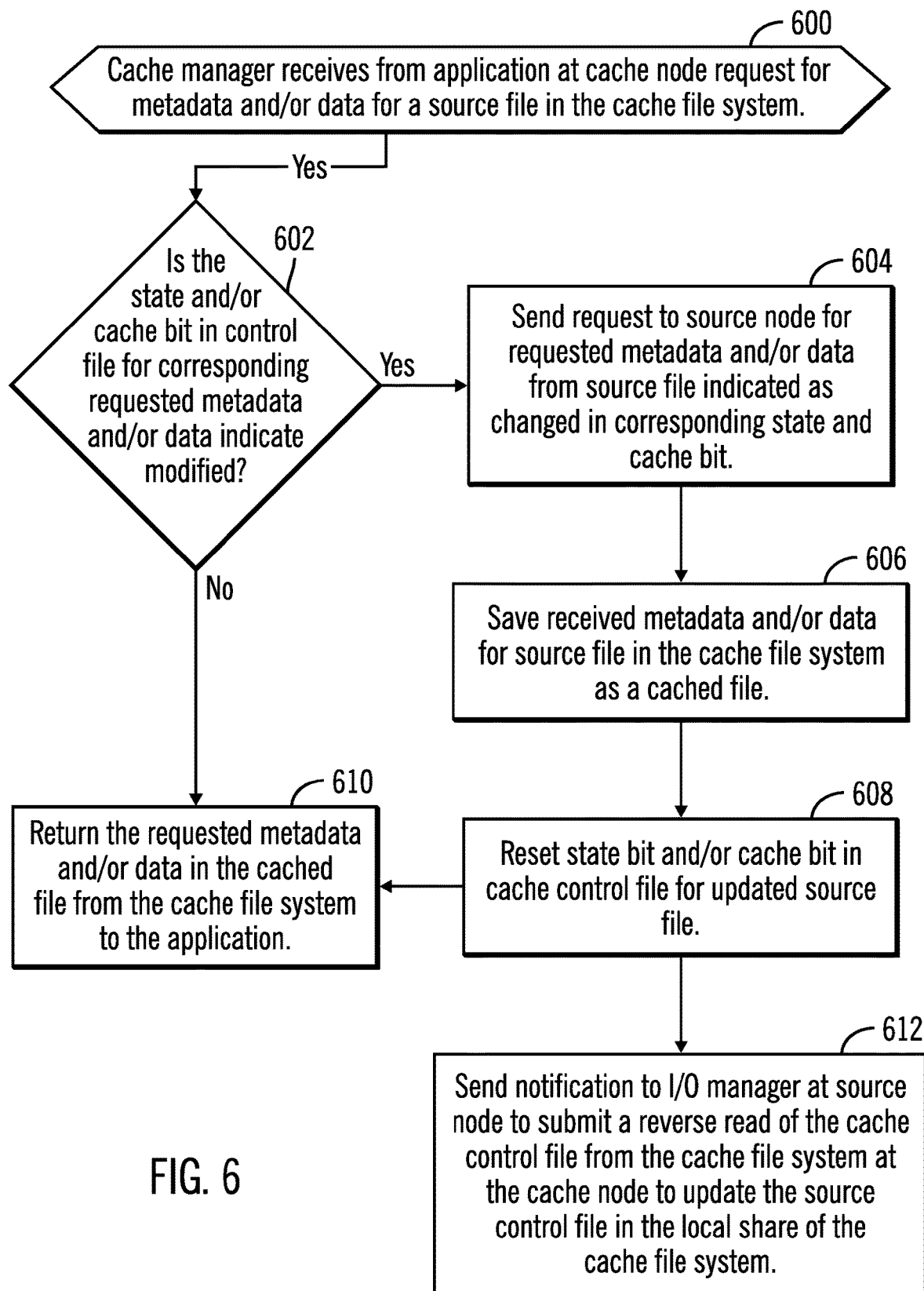
FIG. 6 illustrates an embodiment of operations for the cache node to process a request for a file stored in the source file system and cached in the cache file system.

FIG. 6 illustrates an embodiment of operations performed by the cache manager 112 at the cache node 100 to process requests from applications 114 toward source files 102 cached in the cache file system 110 as cached files 108. Upon receiving (at block 600) an application request for metadata and or file data for a source file 102, the cache manager 112 determines (at block 602) whether the state 204 and/or cache bit 206 in the cache control file 200c for the requested source file 102 indicates metadata or file data for the source file 102 was modified at the source node 106. If (at block 602) the requested metadata and/or file data is modified at the source node 106, then the cache manager 112 sends (at block 604) a request, via the gateway node 120, to the source node 106 for requested metadata and/or file data from the source file 102 indicated as changed in the corresponding state 204 and cache 206 bit. The received metadata and/or file data for the source file 102 is saved (at block 606) in the cache file system 110 as the corresponding cached file 108 and metadata for the corresponding cached file 108. The state bit 204 and cache bit 206 in the cache control file 200c for the updated cached file 108/source file 102 are reset (at block 608) to indicate not modified at the source node 106.

If (at block 602) the state 204 bit and cache 206 bit indicate not modified or after resetting the bits 204, 206 (at block 608), the cache manager 112 returns (at block 610) the requested metadata and/or file for the requested source file 102, stored as corresponding cached file 108, from the cache file system 110 to the requesting application 114. Further, after resetting (at block 608) the state bit 204 and/or cache bit 206, the cache manager 112 sends (at block 612), via the gateway node 120, notification to the I/O manager 116 at the source node 106 to submit a reverse read of the cache control file 200c from the cache file system 110 at the cache node 100 to update the source control file 200s in the local share of the cache file system 124 with the read cache control file 200c.

With the embodiments of FIGS. 5 and 6, the cache manager 112 is notified via the reverse mount of the cache file system 110 at the local share of the cache file system 124 of a change to the source files 102 via an update to the cache control files 200c. Later when processing an access request to a source file 102 cached in the cache file system 110 as a cached file 108, the cache manager 112 may determine from the updated cache control file 200c for the requested file whether the source file 102 and/or metadata for the source file 102 needs to be read and copied back to the cache file system 110 to share with applications 114 at the cache node 114. In this way, the cache manager 112 does not have to continually perform lookups to the source node 106 to determine whether requested files have been modified at the source node 106. With the described operations, the cache file system 110 will be in synchronization with the source file system 104 and receive notifications whenever the source file system 104 is updated so that the cache file system 110 can be updated as well.

Figure 7:
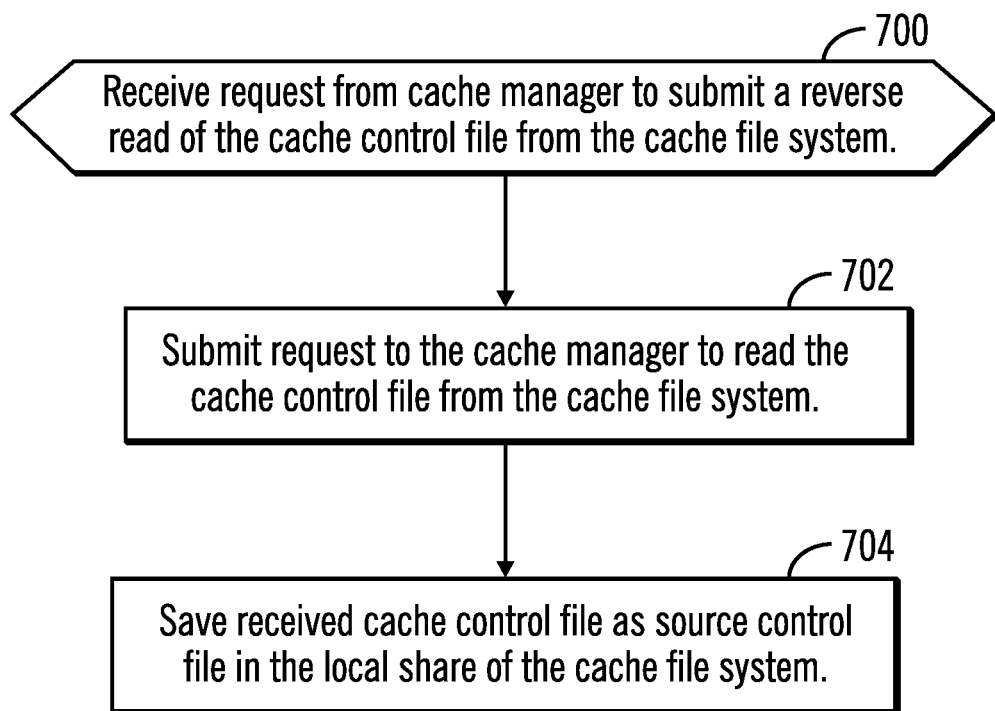
FIG. 7 illustrates an embodiment of operations for the source node to process a request from the cache manager to perform a reverse read of the control file for a file in the cache file system.

FIG. 7 illustrates an embodiment of operations performed by the I/O manager 116 to process a request from the cache manager 112 to perform a reverse read of the cache control file 200c. Upon receiving (at block 700) the request for the reverse read of the cache control file 200c, the I/O manager 116 submits (at block 702) a request, via the gateway node 120, to the cache manager 112 to read the cache control file 200c in the cache file system 110. The I/O manager 116 saves (at block 704) the received cache control file 200c as the source control file 200s in the local share of the cache file system 124 to update with changes made by the cache manager 110.

With the embodiment of FIG. 7, the cache manager 112 triggers the I/O manager 116 to update its source control file 200s with the recent updates to the cache control file 200c to be current.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
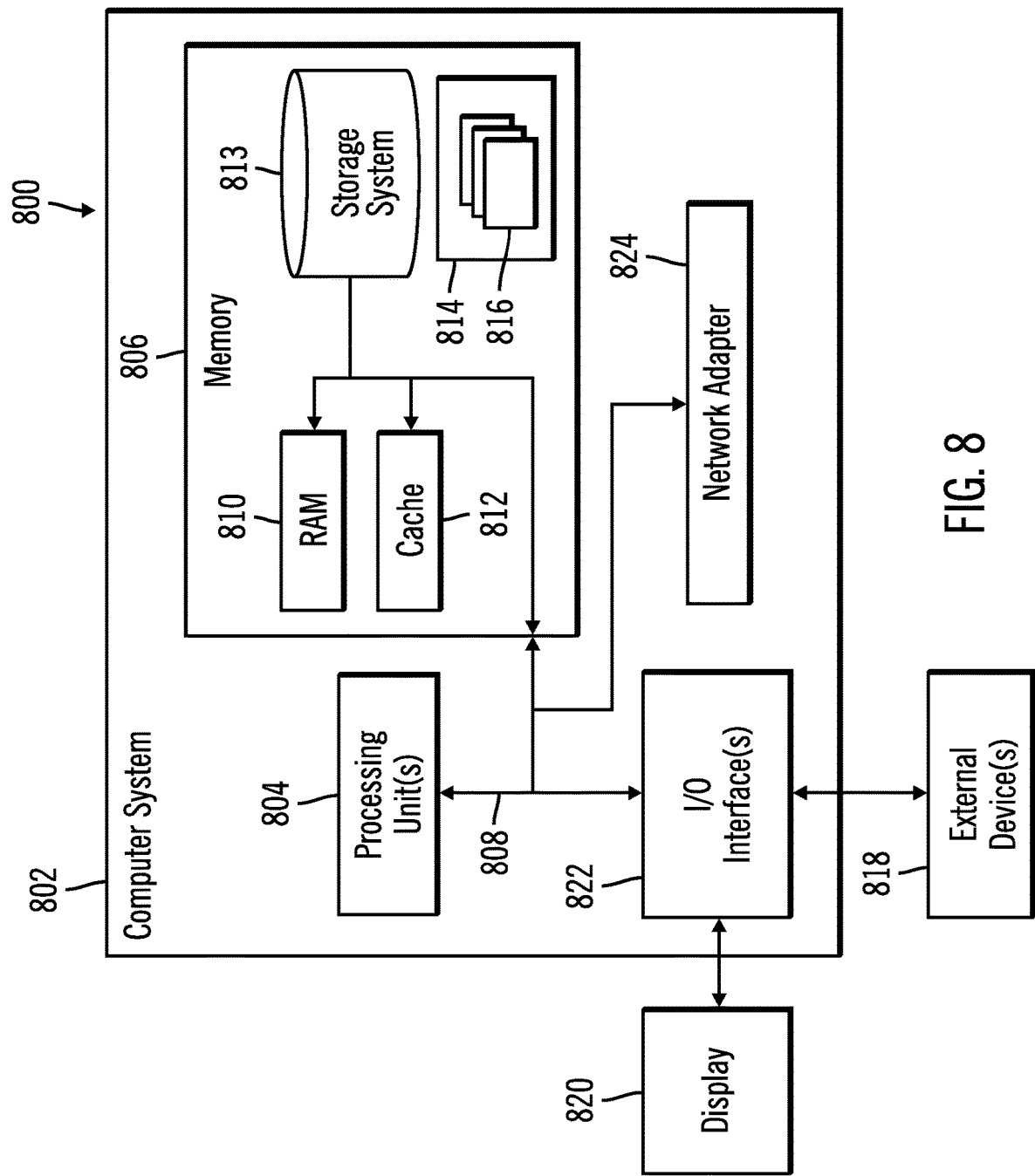
FIG. 8 depicts a computing environment in which the components of FIG. 1 may be implemented.

The computational components of FIG. 1, including the applications 114, 118, cache manager 112, gateway node 120, I/O manager 116, and NFS server 122, may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to, microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for caching data from a source node at a cache node over a network, wherein the computer program product comprises a computer readable storage medium having computer readable program instructions to cause the cache node to perform operations, the operations comprising:

establishing, at the cache node, a cache file system as a local share of a source file system at the source node, wherein the source node establishes a local share of the cache file system at the cache node;

receiving notification, from the source node, that the source node modified a source control file in the local share of the cache file system for a source file at the source node;

in response to receiving the notification, updating a cache control file, for a cached file in the cache file system comprising a copy of the source file, to indicate the source file at the source node is modified;

in response to a request for data in the source file from an application, determining whether the cache control file indicates the requested data in the cache is modified at the source node; and sending a request to the source node to obtain data for the source file in response to determining that the cache control file indicates the requested data as modified.

2. The computer program product of claim 1, wherein the operations further comprise:

returning data for the cached file from the cache file system to the application request in response to the cache control file indicating that the source file is not modified.

3. The computer program product of claim 1, wherein the operations further comprise:

sending a control file request to the source node to reverse mount the cache file system at the source node to establish the local share of the cache file system.

4. The computer program product of claim 3, wherein the operations further comprise:

mounting the cache file system at the cache node in response to an export request from the source node to establish the local share of the source file system at the cache node; and sending the control file request to the source node in response to mounting the cache file system at the cache node to cause the source node to reverse mount the local share of the cache file system at the cache node comprising.

5. A computer program product for caching data from a source node at a cache node over a network, wherein the computer program product comprises a computer readable storage medium having computer readable program instructions to cause the cache node to perform operations, the operations comprising:

establishing, at the cache node, a cache file system as a local share of a source file system at the source node, wherein the source node establishes a local share of the cache file system at the cache node;

receiving notification, from the source node, that the source node modified a source control file for a source file at the source node;

in response to receiving the notification, updating a cache control file, for a cached file in the cache file system comprising a copy of the source file, to indicate the source file at the source node is modified, wherein the source control file and the cache control file include a state bit that indicates whether metadata for the source file was modified at the source node and a cache bit indicating whether data for the source file was modified at the source node, wherein the notification indicates whether the cached bit and the state bit were reset to indicate changes to the cached bit and state bit in the source control file, respectively; and sending a request to the source node to obtain data for the source file indicated as modified in the cache control file in response to an application request for the source file.

6. The computer program product of claim 5, wherein the operations further comprise:

returning to the application request metadata and/or data of the cached file in the cache file system in response to the cache control file indicating no change to the state bit and no change to the cache bit.

7. The computer program product of claim 5, wherein the operations further comprise:

in response to the application request for the metadata for the source file, requesting metadata for the source file from the source node in response to the cache control file indicating a change to the state bit and no change to the cache bit; and setting the state bit to indicate no change in response to receiving the requested metadata for the source file and storing in the cache file system.

8. The computer program product of claim 5, wherein the operations further comprise:

in response to the application request to read data from the source file, submitting a read request to the source node to read the data for the source file in response to the cache control file indicating a change to the cache bit.

9. A system for caching data from a source node at a cache node over a network, comprising:

a processor; and a computer readable storage medium having computer readable program instructions executed by the processor to cause the cache node to perform operations, the operations comprising:

establishing, at the cache node, a cache file system as a local share of a source file system at the source node, wherein the source node establishes a local share of the cache file system at the cache node;

receiving notification, from the source node, that the source node modified a source control file in the local share of the cache file system for a source file at the source node;

in response to receiving the notification, updating a cache control file, for a cached file in the cache file system comprising a copy of the source file, to indicate the source file at the source node is modified;

in response to a request for data in the source file from an application, determining whether the cache control file indicates the requested data in the cache is modified at the source node; and sending a request to the source node to obtain data for the source file in response to determining that the cache control file indicates the requested data as modified.

10. The system of claim 9, wherein the operations further comprise:

sending a control file request to the source node to reverse mount the cache file system at the source node to establish the local share of the cache file system.

11. The system of claim 10, wherein the operations further comprise:

mounting the cache file system at the cache node in response to an export request from the source node to establish the local share of the source file system at the cache node; and sending the control file request to the source node in response to mounting the cache file system at the cache node to cause the source node to reverse mount the local share of the cache file system at the cache node comprising.

12. A system for caching data from a source node at a cache node over a network, comprising:
a processor; and
a computer readable storage medium having computer readable program instructions executed by the processor to cause the cache node to perform operations, the operations comprising:
establishing, at the cache node, a cache file system as a local share of a source file system at the source node, wherein the source node establishes a local share of the cache file system at the cache node;
receiving notification, from the source node, that the source node modified a source control file for a source file at the source node;
in response to receiving the notification, updating a cache control file, for a cached file in the cache file system comprising a copy of the source file, to indicate the source file at the source node is modified, wherein the source control file and the cache control file include a state bit that indicates whether metadata for the source file was modified at the source node and a cache bit indicating whether data for the source file was modified at the source node, wherein the notification indicates whether the cached bit and the state bit were reset to indicate changes to the cached bit and state bit in the source control file, respectively; and
sending a request to the source node to obtain data for the source file indicated as modified in the cache control file in response to an application request for the source file.

13. The system of claim 12, wherein the operations further comprise:
returning to the application request metadata and/or data of the cached file in the cache file system in response to the cache control file indicating no change to the state bit and no change to the cache bit.

14. The system of claim 12, wherein the operations further comprise:
in response to the application request for the metadata for the source file, requesting metadata for the source file from the source node in response to the cache control file indicating a change to the state bit and no change to the cache bit; and
setting the state bit to indicate no change in response to receiving the requested metadata for the source file and storing in the cache file system.

15. A method for caching data from a source node at a cache node over a network, comprising:
establishing, at the cache node, a cache file system as a local share of a source file system at the source node, wherein the source node establishes a local share of the cache file system at the cache node;
receiving notification, from the source node, that the source node modified a source control file in the local share of the cache file system for a source file at the source node;
in response to receiving the notification, updating a cache control file, for a cached file in the cache file system comprising a copy of the source file, to indicate the source file at the source node is modified;
in response to a request for data in the source file from an application, determining whether the cache control file indicates the requested data in the cache is modified at the source node; and
sending a request to the source node to obtain data for the source file in response to determining that the cache control file indicates the requested data as modified.

16. The method of claim 15, further comprising:
sending a control file request to the source node to reverse mount the cache file system at the source node to establish the local share of the cache file system.

17. The method of claim 16, further comprising:
mounting the cache file system at the cache node in response to an export request from the source node to establish the local share of the source file system at the cache node; and
sending the control file request to the source node in response to mounting the cache file system at the cache node to cause the source node to reverse mount the local share of the cache file system at the cache node comprising.

18. A method for caching data from a source node at a cache node over a network, comprising:
establishing, at the cache node, a cache file system as a local share of a source file system at the source node, wherein the source node establishes a local share of the cache file system at the cache node;
receiving notification, from the source node, that the source node modified a source control file for a source file at the source node;
in response to receiving the notification, updating a cache control file, for a cached file in the cache file system comprising a copy of the source file, to indicate the source file at the source node is modified, wherein the source control file and the cache control file include a state bit that indicates whether metadata for the source file was modified at the source node and a cache bit indicating whether data for the source file was modified at the source node, wherein the notification indicates whether the cached bit and the state bit were reset to indicate changes to the cached bit and state bit in the source control file, respectively; and
sending a request to the source node to obtain data for the source file indicated as modified in the cache control file in response to an application request for the source file.

19. The method of claim 18, further comprising:
returning to the application request metadata and/or data of the cached file in the cache file system in response to the cache control file indicating no change to the state bit and no change to the cache bit.

20. The method of claim 18, further comprising:
in response to the application request for the metadata for the source file, requesting metadata for the source file from the source node in response to the cache control file indicating a change to the state bit and no change to the cache bit; and
setting the state bit to indicate no change in response to receiving the requested metadata for the source file and storing in the cache file system.

\* \* \* \* \*